UNITED STATES PATENT OFFICE.

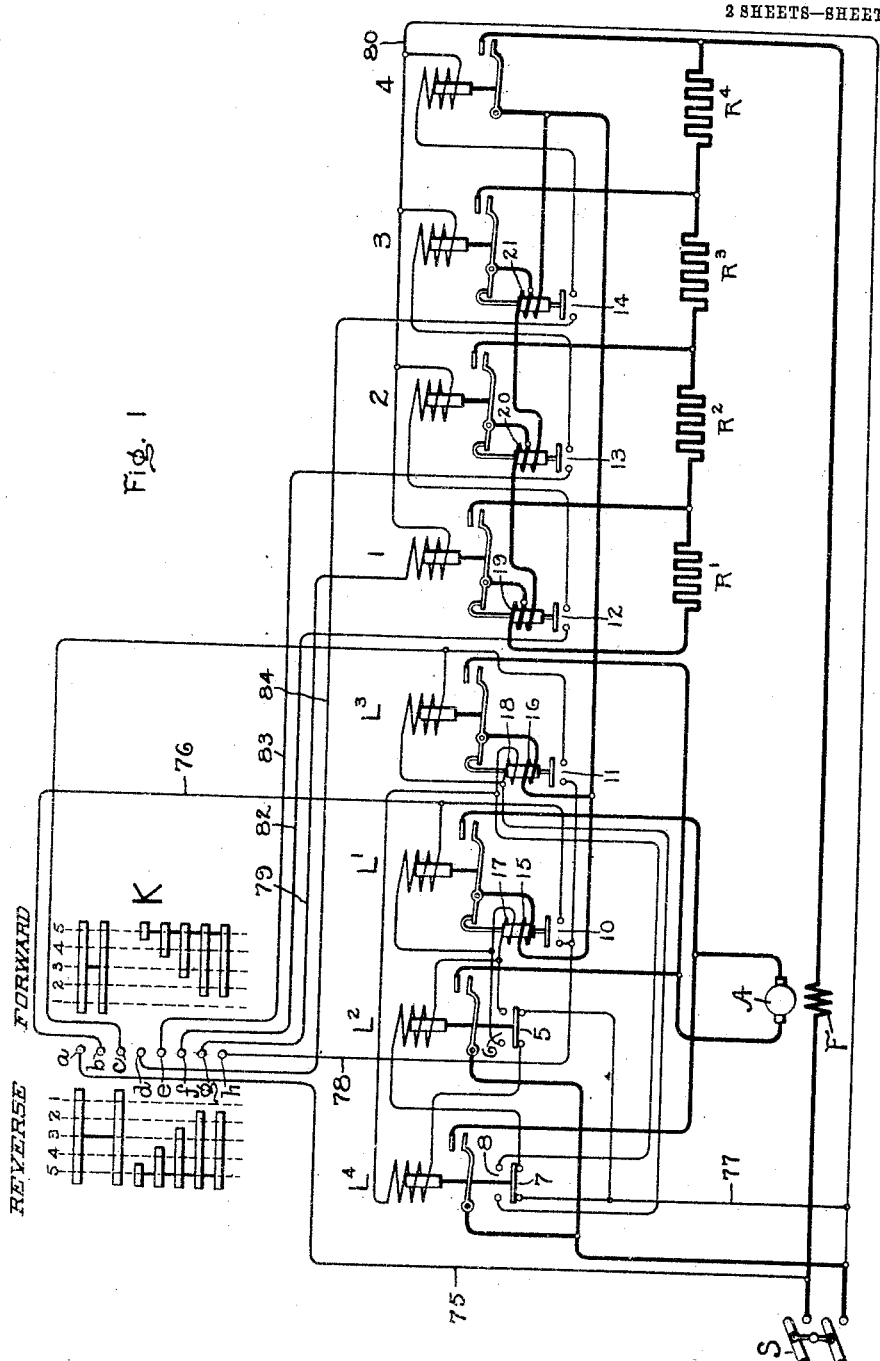

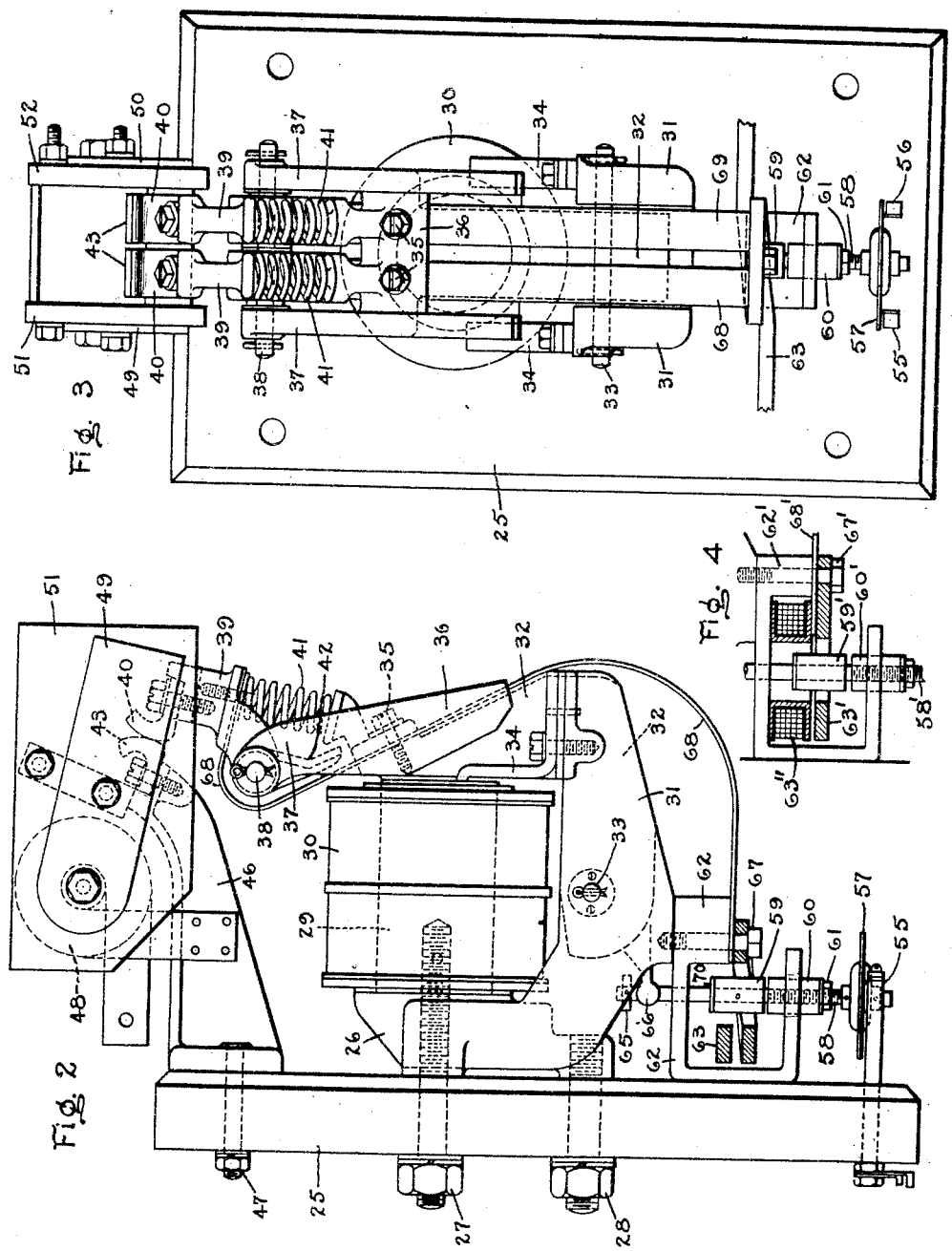

HAROLD E. WHITE, OF SCHENECTADY, NEW YORK, ASSIGNOR TO GENERAL ELECTRIC COMPANY, A CORPORATION OF NEW YORK.

CONTROL OF ELECTRICALLY-OPERATED SWITCHES.

969,738.   Specification of Letters Patent.   Patented Sept. 6, 1910.

Application filed February 27, 1909. Serial No. 480,481.

*To all whom it may concern:*

Be it known that I, HAROLD E. WHITE, a citizen of the United States, residing at Schenectady, county of Schenectady, State of New York, have invented certain new and useful Improvements in the Control of Electrically-Operated Switches, of which the following is a specification.

My invention relates to the operation and control of electrically controlled switches, and particularly to the operation successively in a certain order of a plurality of such switches. It is especially useful in connection with systems of motor control in which a plurality of electrically controlled switches or contactors are arranged to operate in succession to increase step-by-step the voltage applied to the motor. Arrangements of this kind are employed in starters for electric motors and have been so arranged that, by closing a single master-switch, contactors are caused to operate automatically in succession to cut out section by section the resistance interposed in the motor circuit on starting, or in some other way to increase step-by-step the voltage applied to the motor. Similar arrangements have also been used in systems of motor control in which the master-switch has a plurality of "on" positions and serves to regulate the operation of a series of contactors, the arrangement being such that the master-switch may either directly control the operation of the contactors one at a time, or may cause a number, or all of them, to operate automatically in succession. In such systems of control it is desirable that a certain time interval, the length of which depends upon the conditions of service, should elapse between the operation of successive resistance controlling contactors. It is also often desirable that the rate of successive operation of these contactors depend, to a certain extent, upon the current in the motor circuit; that is, that the operation of a succeeding contactor be prevented if the closing of the preceding one has resulted in producing a current in the motor circuit in excess of a certain safe value. Various arrangements have been used for giving this so-called "time and current limit" to the action of a series of switches used for the above described purposes.

The present invention comprises certain improvements in a type of control for a plurality of electrically controlled switches covered in a joint application by Eugene R. Carichoff and myself, Serial No. 480,483, filed February 27, 1909. In systems of control of this type, in the case both of those contactors which initially complete the motor circuit and those contactors which cut out section by section the resistance interposed in the motor circuit on starting, the magnetizing coil of the coöperating auxiliary switch receives its increased current only after the contactor has actually closed. It may happen, therefore, in some arrangements that a contactor, during the first part of its closing movement, will allow the auxiliary switch to move in a closing direction to a certain extent before the increase of current, due to closing of the contactor, has taken place in the magnetizing coil of the electromagnet of the auxiliary switch. Under some conditions this may render the control of the auxiliary switches by their electromagnets somewhat uncertain.

In one aspect, my invention relates to systems or control of the general type covered by the joint application above referred to, and comprises means for maintaining the auxiliary switch substantially at rest during the initial movement of the contactor, that is, until the circuit closed by the contactor has been made, and the increase of current in the magnetizing coil of the auxiliary switch resulting therefrom, has taken place. By my invention I insure that the closing of an auxiliary switch is always subject to the control of its electromagnet.

In another aspect my invention relates to a new and improved form of auxiliary switch attachment for use with electrically controlled switches and systems of control of this type.

Other objects and features of my invention will hereinafter appear and will be particularly pointed out in the appended claims.

In the particular embodiment of my invention which I have illustrated herein, the means for maintaining the auxiliary switches substantially at rest comprises means for causing the magnetization of the electromagnet which controls the closing of an auxiliary switch to be great enough, during the time that its contactor is closing and the change of conditions in the power or motor circuit resulting therefrom is taking place, to maintain the auxiliary switch open, provision being made for rendering this means ineffective after the contactor has closed. In the particular arrangements shown, either I provide a second magnetizing coil, coöperating with the coil which is energized from the power or motor circuit, for the magnet which controls the closing of an auxiliary switch after the same has been released by the closing of its corresponding contactor, said second coil being deënergized upon the closing of said contactor; or I arrange connections with the magnetizing coil which is energized from the power or motor circuit, such that the corresponding contactor in closing shunts a portion of said magnetizing coil. With such arrangements, the number of effective turns in the electromagnet which controls the closing of an auxiliary switch, is greater before the closing of its corresponding contactor than afterward, and the reduction takes place concurrently with the increase in magnetizing current in some of the turns of said magnet, due to the change of conditions in the power or motor circuit resulting from the closing of that contactor. I may use either one or both of the above named arrangements in a system of motor control although, for reasons which will hereinafter appear, I prefer to use the first arrangement in connection with those contactors which initially complete the motor circuit and the latter arrangement in connection with the resistance controlling contactors.

In the drawings, Figure 1 illustrates diagrammatically a system of motor control having my invention incorporated therein; Fig. 2 is a side elevation, partly in section, of a contactor provided with the auxiliary switch arrangement used on the resistance controlling contactors in the system shown in Fig. 1; Fig. 3 is a front elevation of the device shown in Fig. 2; and Fig. 4 is an elevation, partly in section, showing the auxiliary switch attachment used on the line contactors in the system shown in Fig. 1.

I have shown diagrammatically my invention as applied to a simple system of motor control for a direct current motor, but this is merely illustrative and, as will be obvious to those skilled in this art, it may equally well be applied to other forms of dynamo-electric machinery and to other types of control; or, in fact, employed in any connection where it is desired to regulate the conditions in a power circuit by means of a plurality of switches operating in succession.

In the diagrammatic representation which I have employed and in the figures which illustrate the mechanical and electrical construction of the switches or contactors which effect the connections in the motor circuits, I have shown contactors which are electromagnetically operated, but it will, of course, be understood that my invention is equally applicable to those systems of control, now well known, in which the switches are operated pneumatically. It is, therefore, my intention to cover such systems in this application and wherever I have used the expressions " electrically controlled switches " or " contactor " I mean to include both those which are operated electromagnetically and those which are operated electropneumatically or otherwise.

Referring to the drawings, particularly Fig. 1, a source of current is indicated at T, with which the power and control circuits of the system are connected through a switch S. The armature of the motor to be controlled is indicated at A and its field at F, the motor in this case being a series motor, although other types of motor might equally well have been shown. Electrically controlled switches or contactors of any suitable mechanical construction as, for example, that illustrated in Figs. 2 and 3 and hereinafter described, are indicated at $L^1$, $L^2$ and $L^3$, $L^4$ as arranged to connect the motor to the source for either direction of rotation. A starting or control resistance is shown as made up of sections $R^1$, $R^2$, $R^3$ and $R^4$ which may be short circuited by suitable contactors 1, 2, 3 and 4, respectively, the construction of these contactors and of their auxiliary switch attachments being shown in Figs. 2, 3 and 4, and hereinafter described. A master-switch K shown developed in the usual conventional manner, and as of the type in which a drum, provided with suitable segments coöperates in both directions from " off " position with a set of fingers $a$, $b$, $c$, $d$, $e$, $f$, $g$ and $h$. This master-switch serves to regulate the operation of the contactors for both directions of rotation of the motor, one direction of movement serving for forward and the other for reverse operation.

Contactors $L^2$ and $L^4$ are provided, respectively, with auxiliary switches 5 and 6, 7 and 8 which make certain connections in the control circuits. These auxiliary switches are shown in a well known conventional manner and may consist of a contact disk which is mechanically connected to the movable element of the contactor and is arranged to bridge two fixed contacts when in its lower position and two other fixed contacts when in its upper position; from the drawing it will be clear that the switches 5 and 7 are closed when the contactors $L^2$ and $L^4$ are open, and are open when said contactors are closed, while the switches 6 and 8 are open when the contactors are open and are closed when the contactors are closed. Contactors $L^1$, $L^3$, 1, 2 and 3 are provided with an auxiliary switch attachment, the construction of which will be more fully explained in connection with Figs. 2, 3 and 4 in which they are illustrated. These auxiliary switches are denoted in Fig. 1 by the characters 10, 11, 12, 13 and 14. Briefly stated, these auxiliary switch attachments comprise fixed contacts which are bridged by a contact disk of usual form, to which is secured a core of magnetic material having extending upwardly from it a rod which at its upper end is engaged by a part of the movable member of the contactor, being thereby held in its raised position when the contactor is open and permitted to fall when the contactor is closed. Said core is arranged to move in the field of an electromagnet, the energization of which depends upon the current in the motor circuit. In the case of the auxiliary switch attachments to the contactors L¹ and L³, shown in Fig. 4, the electromagnet is provided with two coils, one a coil 15 or 16 arranged in the motor circuit, and the other a coil 17 or 18 connected in one of the control circuits, as shown in the drawing and hereinafter described. In the case of the auxiliary switch attachments to the resistance controlling contactors 1, 2 and 3, the magnetizing coils 19, 20 and 21 are all connected in series in the motor circuit when these contactors are open. The coils 19, 20 and 21 each have a connection leading from some point intermediate its ends, and said coils are so connected with reference to their corresponding contactors that each of said contactors in closing short circuits a portion of said magnetizing coil, as well as the corresponding section of resistance; the arrangements of these connections will be clear from Fig. 1.

Referring now to Figs. 2, 3 and 4, I will proceed to describe the particular arrangement of contactor and switch attachments which I have found well suited to the carrying out of my invention. As far as the construction of the contactor itself is concerned, that shown in Figs. 2 and 3 is well adapted for all of the contactors used in the system of control illustrated. The particular arrangement of magnetizing coil for the auxiliary switch attachment shown in Figs. 2 and 3 corresponds, however, particularly with those attachments diagrammatically illustrated in Fig. 1 in connection with contactors 1, 2 and 3. In Fig. 4, I have shown how the auxiliary switch magnet of Figs. 2 and 3 can be modified to correspond with the arrangement shown in Fig. 1 in connection with the contactors L¹ and L³. Referring to Figs. 2 and 3, 25 is a backboard of suitable insulating material, to which is secured a casting 26 by means of bolts 27 and 28 passing through the backboard 25. The form of the casting 26 will be apparent from the drawing, it being understood that the cylindrical portion 29 thereof extends outwardly to form the core upon which the actuating coil 30 of the contactor is mounted, while ears 31 extend outwardly below the coil 30 and receive between them the movable armature 32 which is pivoted upon a pin 33 extending through the ears 31 and through said armature 32. Angle irons 34 bolted to the top of the ends of the ears 31 serve to hold the coil 30 on the core 29, while at the same time providing for its easy removal. Bolted to the armature 32 by bolts 35 is a casting 36 having ears 37 between which, on the pin 38 are pivoted contact fingers 39 carrying removable lips 40 of well known form. The pivoted contact fingers 39 are forced in a counterclockwise direction by the springs 41 arranged as shown, heels 42, which engage with a shoulder upon the casting 36, serving to limit the movement of the fingers 39 by the springs 41. The lips 40 coöperate with lips 43 removably secured to a bracket 46 bolted to the backboard 25 by a bolt 47, as clearly shown. This bracket 46 carries the magnetic blowout coil 48 having the pole pieces 49 and 50 embedded in the walls 51 and 52 of an arc chute formed of suitable arc resisting material. This particular construction of contactor I do not regard as my invention, and I wish it to be understood that many other forms may be employed equally well. Below the contactor and secured to the backboard 25 are fixed contact members 55 and 56 which are bridged by a contact disk 57 of well known form, carried by a rod 58. The rod 58 carries a core 59 of magnetic material fixed on said rod and another core 60 of magnetic material which is adjustable on said rod, being held in any desired position by means of a nut 61. The cores 59 and 60 move in the field of an electromagnet composed of a frame 62 of magnetic material, of the form shown in Fig. 2, which is bolted to the bottom of the frame 26 of the contactor, the coil of the electromagnet being shown in Figs. 2 and 3 as a single turn of heavy conductor 63. The core 60 passes freely through a hole in the lower part of the frame 62 and the upper end of the rod 58 passes freely through a hole in the upper part of said frame, as clearly seen from Fig. 2. The holes in the frame 62 may be lined with brass tubing, in any well known manner, to prevent sticking. The upper end of the rod 58 carries pinned to it a disk or washer 65, beneath which on each side of the rod 58 extend heels 66 projecting from and preferably formed integral with the armature 32. The outer turn of the conductor 63 is bolted to the frame 62 by the bolts 67, by which the frame 62 is secured to the frame 26, and the ends of flexible conductors 68 and 69 are clamped between the conductor 63 and the frame 62 and serve to make good electrical connection between this point on the coil of the conductor 63 and the movable contact fingers 39, the other ends of these conductors 68 and 69 being secured to these contact fingers as clearly shown in the drawing and as well understood by those familiar with contactor construction. As shown in Figs. 2 and 3, the contactor and the auxiliary switch are both closed. In this position the heels 66 are in their lower position and the rod 58, carrying the contact disk 57, is free to drop, unless it is held in its raised position by the magnetizing effect of the coil 63, as hereinafter explained. A brass washer 70 on the top of the core 59 may be used to prevent this sticking to the upper part of the frame 62 when the core is in its raised position. The adjustability of the core 60 upon the rod 58 allows the air gap between this core and the core 59 to be varied and the permeability of the magnetic circuit adjusted, thereby allowing regulation of the current necessary in the coil 63 in order to hold the auxiliary switch open after the closing of the contactor.

In Fig. 4 is shown an arrangement of coils for the magnet of the auxiliary switch attachment of the kind indicated in Fig. 1 in connection with contactors $L^1$ and $L^3$. In this arrangement the field frame 62' is similar to that shown in Fig. 2; and the movable parts of the auxiliary switch attachment, consisting of the cores 59' and 60' mounted on the rod 58', may be exactly the same as these parts in the arrangement of Fig. 2. The coil which is energized from the power circuit, may consist of three quarters of a turn of heavy conductor 63' arranged as shown, the end of the same being supported and held in good electrical engagement with the ends of the flexible conductors 68' by means of the bolt 67' as in Fig. 2. Above the heavy conductor 63' is a coil 63'' of finer wire which corresponds to the coils 17 and 18 indicated in Fig. 1 in connection with conductors $L^1$ and $L^3$. It will be obvious to those skilled in this art that the number of turns both of the heavy conductor, which is energized from the power circuit, and the coil which is energized from the control circuits may be varied to suit particular conditions; and it is also obvious that the field structure of the auxiliary switch attachment may be modified as desired.

The arrangement of motor and control circuits will be clear from the following description of the mode of operation of the system. The switch S being closed and the master-switch K being moved to its first forward position, a circuit is completed from the $+$ side of the source, through the wire 75, through the controller fingers $a$ and $b$ and their coöperating segments, to the wire 76, thence through the actuating coil of the contactor $L^1$, the magnetizing coil 17, actuating coil of the contactor $L^2$, auxiliary switch 7, through the wire 77 to the $-$ side of the source. The contactors $L^1$ and $L^2$ are, therefore, closed and a motor circuit will be completed as follows: From the $+$ side of the source, through the field F, resistance sections $R^4$, $R^3$, $R^2$, $R^1$, through the whole of the magnetizing coils 19, 20 and 21 of the auxiliary switches 12, 13 and 14, through the coil 15 of the auxiliary switch 10, through the main contacts of contactor $L^1$, armature A, main contactor $L^2$ to the $-$ side of the source. As long as the master-switch K remains in its first position no further operation of the contactors will take place and the motor will remain connected to the source through all of the resistance. If the master-switch K is moved to its second forward position, the fingers $g$ and $h$ are brought into engagement with their coöperating segments and are connected by them. It will be seen from the diagram that the finger $h$ is, by a wire 78, connected through the switch 10 to the wire 76 and, therefore, if the auxiliary switch 10 is closed current will flow from the wire 76 through said switch 10, through wire 78, fingers $h$ and $g$ and their coöperating segments, wire 79, actuating coil of the contactor 1, and back to the $-$ side of the source through the return wire 80, thereby causing the closing of the contactor 1 and the short circuiting of the section of resistance $R^1$. The closing of the switch 10, however, is under the control of the current in the motor circuit, and if this exceeded a certain value at the time the master-switch was thrown to its second position, the switch 10 was not closed and the closing of the contactor 1 was prevented. In this connection it is to be noted that the coil 17 is energized concurrently with the actuating coils of the contactors $L^1$ and $L^2$, and although said coil 17 was short circuited by closing of the switch 6 when the contactor $L^2$ closed, the magnetization furnished by the coil 17 serves to hold the auxiliary switch 10 open until the motor current has time to build up and energize the coil 15. Closing of the switch 10, upon the closing of the contactor $L^1$, is therefore, prevented before the current in the motor circuit becomes effective in the coil 15.

As long as the master-switch remains in its second position, the line contactors $L^1$ and $L^2$ and the first resistance contactor 1 only will be closed. In moving the master-switch to its third forward position, the finger $f$ comes into engagement with its coöperating segment and is connected to the wire 78 as was the finger $g$. A wire 82 leads from the finger $f$ through the auxiliary switch 12 to the actuating coil of the contactor 2, and thence, through the return wire 80 to the $-$ side of the source. If, therefore, the switch 12 has closed the contactor 2 will be closed and the section of resistance R² will be short-circuited. Closing of the switch 12 takes place under the control of the motor current in the magnetizing coil 19, it being noted that the switch 1 in closing short circuited not only the section of resistance R¹ but also a portion of the magnetizing coil 19, the manner in which this is accomplished being clear from the diagram and the foregoing description of the auxiliary switch attachment. By initially allowing the motor current to pass through the whole of the coil 19, the holding of the switch 12 open, until the increase of current due to short circuiting of the resistance R¹ has taken place, is insured. It is obvious that further movement of the master-switch in the "on" direction will result in successively energizing the wires 83 and 84 and closing of the contactors 3 and 4 under the control of the auxiliary switches 13 and 14, respectively. It will, of course, be understood that the resistance controlling contactors 1, 2, 3 and 4 may not only be closed one at a time under the control of the master-switch K, but the master-switch K may, if desired, be thrown immediately to its full "on" position, whereupon the closing of the contactors will take place automatically in succession under the control of the auxiliary switch attachments which respond to the current in the motor circuit and prevent cutting out of the resistance too rapidly.

It will be obvious to those skilled in this art that my invention may be embodied in a variety of forms, and it is my intention to cover in the following claims all such embodiments as come within the scope of my invention.

What I claim as new and desire to secure by Letters Patent of the United States, is:—

1. In combination with a power circuit, a plurality of contactors intended for operation in succession to effect certain connections in said power circuit, auxiliary switches coöperating with certain of said contactors each arranged to control the operation of a succeeding contactor, means for holding each auxiliary switch open while its coöperating contactor is open, an electromagnet coöperating with each auxiliary switch for controlling the closing of said auxiliary switch, and means for maintaining the auxiliary switch substantially at rest during the closing operation of the coöperating contactor.

2. In combination with a power circuit, a plurality of contactors intended for operation in succession to effect certain connections in said power circuit, auxiliary switches coöperating with certain of said contactors each arranged to control the operation of a succeeding contactor, means for holding each auxiliary switch open while its coöperating contactor is open, an electromagnet coöperating with each auxiliary switch for controlling the closing of said auxiliary switch, and electrical means for maintaining the auxiliary switch substantially at rest during the closing of the coöperating contactor.

3. In combination with a power circuit, a plurality of contactors intended for operation in succession to effect certain connections in said power circuit, a plurality of auxiliary switches each arranged to control the operation of a contactor, a plurality of electromagnets each coöperating with an auxiliary switch, and connections whereby a contactor in closing weakens the magnetizing effect of the electromagnet of its coöperating auxiliary switch.

4. In combination with a power circuit, a plurality of contactors intended for operation in succession to effect certain connections in said power circuit, a plurality of auxiliary switches each arranged to control the operation of a contactor, a plurality of electromagnets each coöperating with an auxiliary switch, and connections whereby a contactor in closing decreases the number of effective turns in the electromagnet of its coöperating auxiliary switch.

5. In combination with a power circuit, a plurality of contactors intended for operation in succession to effect certain connections in said power circuit, auxiliary switches coöperating with certain of said contactors each arranged to control the operation of a succeeding contactor, means for holding each auxiliary switch open while its coöperating contactor is open, an electromagnet coöperating with each auxiliary switch, and connections whereby a contactor in closing weakens the magnetizing effect of the coil of its coöperating auxiliary switch.

6. In combination with a power circuit, a plurality of contactors intended for operation in succession to effect certain connections in said power circuit, auxiliary switches coöperating with certain of said contactors each arranged to control the operation of a succeeding contactor, means for holding each auxiliary switch open while its coöperating contactor is open, an electromagnet coöperating with each auxiliary switch, and connections whereby a contactor in closing decreases the number of effective turns in the electromagnet of its coöperating auxiliary switch.

7. In combination with a power circuit, a plurality of contactors intended for operation in succession to effect certain connections in said power circuit, a plurality of auxiliary switches each arranged to control the operation of a contactor, a plurality of electromagnets each arranged to coöperate with an auxiliary switch, and connections whereby a contactor in closing shunts a portion of the electromagnet of the auxiliary switch which controls the succeeding contactor.

8. In combination with a power circuit, a plurality of contactors intended for operation in succession to effect certain connections in said power circuit, auxiliary switches coöperating with certain of said contactors each arra ;ed to control the operation of a succeeding contactor, means for holding each auxiliary switch open while its coöperating contactor is open, an electromagnet coöperating with each auxiliary switch, and connections whereby a contactor in closing shunts a portion of the electromagnet of its coöperating auxiliary switch.

9. In combination with a power circuit, a plurality of contactors intended for operation in succession to effect certain connections in said power circuit, a plurality of auxiliary switches each arranged to control the operation of a contactor, a plurality of electromagnets each coöperating with an auxiliary switch, and connections whereby a contactor in closing weakens the magnetizing effect of the electromagnets of those auxiliary switches which control said contactor and the succeeding contactor.

10. In combination with a power circuit, a plurality of contactors intended for operation in succession to effect certain connections in said power circuit, auxiliary switches coöperating with certain of said contactors, each arranged to control the operation of a succeeding contactor, means for holding each auxiliary switch open while its coöperating contactor is open, an electromagnet coöperating with each auxiliary switch for controlling the closing of said auxiliary switch, and connections whereby a contactor in closing weakens the magnetizing effect of the electromagnets of those auxiliary switches which control said contactor and the succeeding contactor.

11. In combination with a power circuit, a plurality of contactors intended for operation in succession to effect certain connections in said power circuit, auxiliary switches coöperating with certain of said contactors each arranged to control the operation of a succeeding contactor, means for holding each auxiliary switch open while its coöperating contactor is open, an electromagnet coöperating with each auxiliary switch for controlling the closing of said auxiliary switch, and connections whereby each contactor in closing shunts the electromagnet of the auxiliary switch which controls said contactor and a portion of the electromagnet of the auxiliary switch which controls the succeeding contactor.

12. In combination with a power circuit, a plurality of contactors intended for operation in succession to effect certain connections in said power circuit, a plurality of auxiliary switches each arranged to control the operation of a contactor, a plurality of electromagnets each arranged to coöperate with an auxiliary switch, and connections whereby a contactor in closing both effects the desired connection in the power circuit and shunts a portion of the electromagnet which controls the succeeding auxiliary switch.

13. In combination with a power circuit, a plurality of contactors intended for operation in succession to effect certain connections in said power circuit, a plurality of auxiliary switches each arranged to control the operation of a contactor, a plurality of electromagnets each arranged to coöperate with an auxiliary switch, and connections whereby a contactor in closing both effects the desired connection in the power circuit and shunts the electromagnet coöperating with the auxiliary switch which controls that contactor and shunts a portion of the electromagnet of the auxiliary switch which controls the succeeding contactor.

14. In combination with a power circuit, a plurality of contactors intended for operation in succession to effect certain connections in said power circuit, auxiliary switches each coöperating with a contactor and arranged to control a succeeding contactor, a connection between each contactor and its auxiliary switch whereby when the former is open the latter is held open and when the former is closed the latter is permitted to close, an electromagnet energized from the power circuit arranged to control the closing of each auxiliary switch, and means independent of the power circuit to be controlled for maintaining each auxiliary switch open until the closing of its corresponding contactor and until changes in the power circuit due to the closing of that contactor have taken place.

15. In combination with a power circuit, a plurality of contactors intended for operation in succession to effect certain connections in said power circuit, auxiliary switches each coöperating with a contactor and arranged to control a succeeding contactor, a connection between each contactor and its auxiliary switch whereby when the former is open the latter is held open and when the former is closed the latter is permitted to close, an electromagnet energized from the power circuit arranged to control the closing of each auxiliary switch, and means for maintaining the magnetization of said electromagnet great enough during the closing of its corresponding contactor to hold said auxiliary switch open independently of the mechanical connection with its contactor, said means being rendered inoperative upon the closing of the contactor.

16. In a system of motor control, a resistance, a plurality of contactors intended for operation in succession to short circuit said resistance section by section, a plurality of auxiliary switches each arranged to control a contactor, an electromagnet energized from the motor circuit arranged to prevent the closing of an auxiliary switch while the current in the motor circuit exceeds a certain value, and connections whereby each contactor in closing shunts both a section of resistance and a portion of the electromagnet coöperating with the auxiliary switch which controls the control circuit of the succeeding contactor.

17. In a system of motor control, a resistance, a plurality of contactors intended for operation in succession to short-circuit said resistance section by section, auxiliary switches coöperating with certain of said contactors each arranged to control a succeeding contactor, means for holding each auxiliary switch open while its coöperating contactor is open, an electromagnet coöperating with each auxiliary switch and energized from the power circuit, and connections whereby each contactor in closing shunts both a section of resistance and a portion of the electromagnet coöperating with the auxiliary switch which controls the control circuit of the succeeding contactor.

18. In combination with a power circuit, a plurality of contactors intended for operation in succession to effect certain connections in said power circuit, auxiliary switches each coöperating with a contactor and arranged to control a succeeding contactor, a connection between each contactor and its auxiliary switch whereby when the former is open the latter is held open and when the former is closed the latter is permitted to close, an electromagnet having a magnetizing coil energized from said power circuit and a second magnetizing coil energized independently of the power circuit to be controlled arranged to prevent the closing of that auxiliary switch coöperating with the first of the plurality of contactors, means for causing the deënergization of the last mentioned magnetizing coil upon the closing of the corresponding contactor, an electromagnet having a magnetizing coil energized from said power circuit arranged to control the closing of each auxiliary switch coöperating with those contactors other than the first, and connections such that each of the last mentioned contactors in closing shunts a portion of the magnetizing coil of the magnet which controls the closing of its coöperating auxiliary switch.

19. In combination with a power circuit, a plurality of contactors intended for operation in succession to effect certain connections in said power circuit, control circuits for said contactors, auxiliary switches each coöperating with a contactor and arranged to control the control circuit of a succeeding contactor, a connection between each contactor and its auxiliary switch whereby when the former is open the latter is held open and when the former is closed the latter is permitted to close, an electromagnet the energization of which depends upon the current in the power circuit arranged to prevent the closing of said auxiliary switch if the current in the power circuit exceeds a certain value, and means independent of the magnitude of the current in the power circuit for maintaining the auxiliary switch open until the closing of the corresponding contactor and until the increase in current in the power circuit, due to the closing of that contactor, has taken place.

20. In combination with a power circuit, a plurality of contactors intended for operation in succession to effect certain connections in said power circuit, control circuits for said contactors, auxiliary switches each coöperating with a contactor and arranged to control the control circuit of a succeeding contactor, a connection between each contactor and its auxiliary switch whereby when the former is open the latter is held open and when the former is closed the latter is permitted to close, an electromagnet the energization of which depends upon the current in the power circuit arranged to prevent the closing of said auxiliary switch if the current in the power circuit exceeds a certain value, and means for maintaining the magnetization of said electromagnet great enough during the closing of the corresponding contactor to hold said auxiliary switch open independently of the mechanical connection with its contactor, said means being rendered inoperative upon the closing of the contactor.

21. In combination with a power circuit, a plurality of contactors intended for operation in succession to effect certain connections in said power circuit, control circuits for said contactors, auxiliary switches each coöperating with a contactor and arranged to control the control circuit of a succeeding contactor, a connection between each contactor and its auxiliary switch whereby when the former is open the latter is held open and when the former is closed the latter is permitted to close, an electromagnet the energization of which depends upon the current in the power circuit arranged to prevent the closing of said auxiliary switch if the current in the power circuit exceeds a certain value, and means for decreasing the number of effective turns in the coil of said electromagnet upon the closing of the corresponding contactor.

22. In combination with a power circuit, a plurality of contactors intended for operation in succession to effect certain connections in said power circuit, control circuits for said contactors, auxiliary switches each coöperating with a contactor and arranged to control the control circuit of a succeeding contactor, a connection between each contactor and its auxiliary switch whereby when the former is open the latter is held open and when the former is closed the latter is permitted to close, an electromagnet having a magnetizing coil energized from said power circuit and a second magnetizing coil energized independently of the power circuit arranged to prevent the closing of that auxiliary switch coöperating with the first of the plurality of contactors if the current in the power circuit exceeds a certain value, means for causing the deënergization of the last mentioned magnetizing coil upon the closing of the corresponding contactor, an electromagnet having a magnetizing coil energized from said power circuit arranged to prevent the closing of each auxiliary switch coöperating with those contactors other than the first if the current in the power circuit exceeds a certain value, and connections such that each of the last mentioned contactors in closing shunts a portion of the magnetizing coil of the magnet which controls the closing of its auxiliary switch.

23. A system of motor control comprising a motor, a resistance, a line contactor for connecting said motor in series with said resistance, a plurality of contactors intended for operation in succession to cut out said resistance section by section, control circuits for said contactors, auxiliary switches each coöperating with a contactor and arranged to control the control circuit of a succeeding contactor, a connection between each contactor and its auxiliary switch whereby when the former is open the latter is held open and when the former is closed the latter is permitted to close, an electromagnet having a magnetizing coil energized from said power circuit and a second magnetizing coil energized independently of the power circuit arranged to prevent the closing of the auxiliary switch coöperating with said line contactor if the current in the motor circuit exceeds a certain value, means for causing deënergization of the last mentioned magnetizing coil upon the closing of said line contactor, an electromagnet having a coil energized from said power circuit arranged to prevent the closing of each of the auxiliary switches coöperating with the resistance controlling contactors if the current in the motor circuit exceeds a certain value, and connections such that each resistance contactor in closing shunts a portion of the magnetizing coil of the magnet which controls the closing of its auxiliary switch.

24. In combination with a power circuit, a plurality of contactors intended for operation in succession to effect certain connections in said power circuit, control circuits for said contactors, auxiliary switches each coöperating with a contactor and arranged to control the control circuit of a succeeding contactor, a connection between said contactor and its auxiliary switch whereby when the former is open the latter is held open and when the former is closed the latter is permitted to close, an electromagnet having a magnetizing coil energized from said power circuit and a second magnetizing coil energized independently of the power circuit arranged to control the closing of said auxiliary switch, and means for causing the deënergization of the last mentioned magnetizing coil concurrently with the closing of the corresponding contactor.

25. In combination with a power circuit, a plurality of contactors intended for operation in succession to effect certain connections in said power circuit, control circuits for said contactors, auxiliary switches each coöperating with a contactor and arranged to control the control circuit of a succeeding contactor, a connection between each contactor and its auxiliary switch whereby when the former is open the latter is held open and when the former is closed the latter is permitted to close, an electromagnet having a magnetizing coil energized from said power circuit arranged to control the closing of said auxiliary switch, and connections such that each contactor in closing shunts a portion of the magnetizing coil of the magnet which controls the closing of its auxiliary switch.

26. In combination with a power circuit, a plurality of contactors intended for operation in succession to effect certain connections in said power circuit, control circuits for said contactors, auxiliary switches each coöperating with a contactor and arranged to control the control circuit of a succeeding contactor, a connection between the movable member of each contactor and the movable member of its auxiliary switch whereby when the contactor is open the auxiliary switch is held open and when the contactor is closed its auxiliary switch is permitted to close, an electromagnet having a magnetizing coil energized from the power circuit coöperating with the movable member of each auxiliary switch and arranged to control the closing of said switch, and connections including a connection from a point on said magnet coil to the corresponding contactor whereby when the latter is closed a portion of said magnet coil is shunted and its number of effective turns thereby decreased.

27. The combination with a contactor having a fixed contact member, a movable contact member, an actuating coil for moving said movable contact member into engagement with said fixed contact member, of an auxiliary switch attachment comprising a fixed contact member, a movable contact member, a connection between the movable contact member of said contactor and the movable contact member of said auxiliary switch attachment whereby when said contactor is open the contacts of said auxiliary switch attachment are held open and when said contactor is closed the contacts of said auxiliary switch attachment are permitted to close, a magnet coil for controlling the closing of the contacts of the auxiliary switch attachment, and an electrical connection between a point on said magnet coil intermediate its ends and the movable contact member of said contactor.

28. The combination with a contactor having a fixed contact member, a movable contact member, an actuating coil for moving said movable contact member into engagement with said fixed contact member, of an auxiliary switch attachment comprising a fixed contact member, a movable contact member, a connection between the movable contact member of said contactor and the movable contact member of said auxiliary switch attachment whereby when said contactor is open the contacts of said auxiliary switch attachment are held open and when said contactor is closed the contacts of said auxiliary switch attachment are permitted to close, and a magnet for controlling the closing of the contacts of the auxiliary switch attachment having a magnetizing coil of many turns of small wire and a magnetizing coil of a few turns of large conductor.

29. The combination with a contactor having a fixed contact member, a movable contact member, an actuating coil for moving said movable contact member into engagement with said fixed contact member, of an auxiliary switch attachment comprising a fixed contact member, a movable contact member, a connection between the movable contact member of said contactor and the movable contact member of said auxiliary switch attachment whereby when said contactor is open the contacts of said auxiliary switch attachment are held open and when said contactor is closed the contacts of said auxiliary switch attachment are permitted to close, a core of magnetic material connected to the movable contact member of the auxiliary switch attachment, a second core adjustably arranged on the same axis as said first mentioned core, and a magnet coil in the field of which said cores are arranged to move as the contacts of said auxiliary switch attachment open and close.

In witness whereof, I have hereunto set my hand this 26th day of February, 1909.

HAROLD E. WHITE.

Witnesses:
BENJAMIN B. HULL,
HELEN ORFORD.

DISCLAIMER.

969,738.—*Harold E. White*, Schenectady, N. Y. CONTROL OF ELECTRICALLY-OPERATED SWITCHES. Patent dated September 6, 1910. Disclaimer filed May 17, 1918, by the assignee, *General Electric Company*.

Enters this disclaimer

"As to claims 1 and 19 of said patent, which claims read as follows:

"1. In combination with a power circuit, a plurality of contactors intended for operation in succession to effect certain connections in said power circuit, auxiliary switches coöperating with certain of said contactors each arranged to control the operation of a succeeding contactor, means for holding each auxiliary switch open while its coöperating contactor is open, an electromagnet coöperating with each auxiliary switch for controlling the closing of said auxiliary switch, and means for maintaining the auxiliary switch substantially at rest during the closing operation of the coöperating contactor.

"19. In combination with a power circuit, a plurality of contactors intended for operation in succession to effect certain connections in said power circuit, control circuits for said contactors, auxiliary switches each coöperating with a contactor and arranged to control the control circuit of a succeeding contactor, a connection between each contactor and its auxiliary switch whereby when the former is open the latter is held open and when the former is closed the latter is permitted to close, an electromagnet the energization of which depends upon the current in the power circuit arranged to prevent the closing of said auxiliary switch if the current in the power circuit exceeds a certain value, and means independent of the magnitude of the current in the power circuit for maintaining the auxiliary switch open until the closing of the corresponding contactor and until the increase in current in the power circuit, due to the closing of that contactor, has taken place."

[*Official Gazette May 14, 1918.*]